Figure 1:
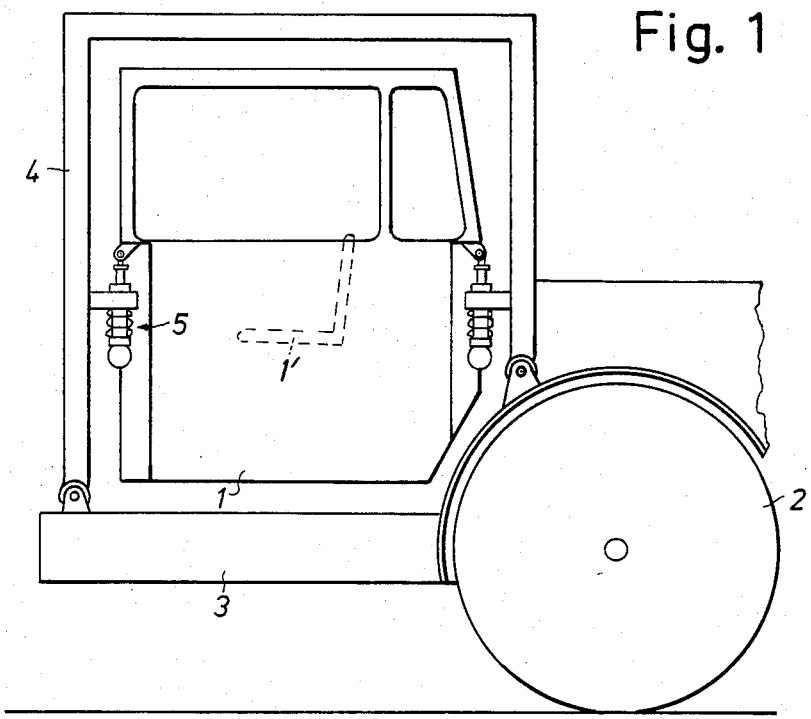

United States Patent [19]

Rova

[11] Patent Number: 4,500,076
[45] Date of Patent: Feb. 19, 1985

[54] ARRANGEMENT IN SPRING SUSPENSION SYSTEMS PARTICULARLY FOR VEHICLES

[76] Inventor: Jan-Erik Rova, Laerkvaegen 20, S-981 37 Kiruna, Sweden

[21] Appl. No.: 628,975

[22] Filed: Jul. 10, 1984

Related U.S. Application Data

[63] Continuation of Ser. No. 355,948, Mar. 8, 1982, abandoned.

[30] Foreign Application Priority Data

Mar. 10, 1981 [SE] Sweden ................................ 8101518

[51] Int. Cl.³ ............................................. B62D 27/04
[52] U.S. Cl. ................................ 267/8 R; 188/321.11; 267/35; 296/190; 297/216
[58] Field of Search .................... 296/190, 35.1, 65 R; 297/216, 307; 267/8 R, 64.23, 8 B, 64.25, 35, 64.26, 64.15, 64.27, 140.5, 140.4, 140.1, 140.3, 33, 113, 141.1, 117, 141, 131–133, 61, 60, 166, 63; 403/4, 261; 180/89.13–89.17; 248/562–566, 609–611; 188/321.11, 269, 322.16

[56] References Cited

U.S. PATENT DOCUMENTS

| | | | |
|---|---|---|---|
| 2,353,763 | 7/1944 | Rodman | 248/611 X |
| 2,468,939 | 5/1949 | Mercier | 188/321.11 |
| 2,639,186 | 5/1953 | Sewelin | 296/35.1 |
| 2,648,536 | 8/1953 | Udstad | 267/33 |
| 2,892,482 | 6/1959 | Beoletto | 297/307 X |
| 3,287,008 | 11/1966 | Fernandez | 267/64.23 X |
| 3,539,170 | 11/1970 | Hamel | 267/63 A |
| 3,944,197 | 3/1976 | Dachicourt | 267/64.23 |
| 4,234,172 | 11/1980 | Takahashi | 267/8 R |
| 4,265,328 | 5/1981 | Rowa et al. | 296/190 X |
| 4,364,582 | 12/1982 | Takahashi et al. | 267/64.23 X |
| 4,389,045 | 6/1983 | Taylor | 267/8 R |
| 4,401,290 | 8/1983 | Butler | 248/565 |
| 4,401,342 | 8/1983 | Andersson | 248/562 X |
| 4,460,168 | 7/1984 | Obadel | 267/8 R X |

FOREIGN PATENT DOCUMENTS

| | | |
|---|---|---|
| 1630772 | 2/1971 | Fed. Rep. of Germany . |
| 2219995 | 11/1972 | Fed. Rep. of Germany . |
| 2555995 | 7/1976 | Fed. Rep. of Germany . |
| 2601087 | 7/1976 | Fed. Rep. of Germany . |
| 2512818 | 9/1976 | Fed. Rep. of Germany . |
| 171203 | 12/1934 | Switzerland ................ 188/321.11 |
| 698953 | 10/1953 | United Kingdom ................ 267/35 |

*Primary Examiner*—Douglas C. Butler
*Attorney, Agent, or Firm*—Pollock, Vande Sande & Priddy

[57] ABSTRACT

A spring suspension system allowing movements between the drive compartment and a frame portion of a heavy duty vehicle with a plurality of degrees of freedom and with a frequency range of from as low as about 1 Hz and up to 5000 Hz and more, comprises at least one axially operative spring member formed with a rigid cylindrical outer surface and mounted between the compartment and frame portion of the vehicle. The spring member is connected to one of these vehicle components by a supplemental elastomeric spring which surrounds the cylindrical outer surface of the spring and the spring member is connected to the other of the vehicle components by an articulation.

6 Claims, 5 Drawing Figures

ARRANGEMENT IN SPRING SUSPENSION SYSTEMS PARTICULARLY FOR VEHICLES

This application is a continuation of application Ser. No. 355,948, filed Mar. 8, 1982, now abandoned.

The present invention refers to an arrangement in spring suspension systems, particularly for vehicles, for allowing movements with a plurality of or all degrees of freedom between two bodies and with a frequency range of from as low as about 1 Hz and up to 5000 Hz and more, said arrangement comprising at least one spring member formed with a rigid cylindrical outer surface and operative axially and mounted between said pair of bodies.

The present inventor's prior U.S. Pat. No. 4,265,328, issued May 5, 1981, discloses a spring system or suspension primarily adapted for a driver's compartment in heavy contractor vehicles and similar ones with unsprung wheel suspensions wherein the driver's compartment is subject to vibrations. For enabling accommodation of all vibration frequencies down to as low as about 1 Hz, a particular arrangement of spring means has been suggested wherein the spring means are equally distributed around the periphery of said driver's compartment such that their axes of action form an acute angle to the vertical. The practical embodiment of said invention has primarily utilized helically coiled pressure springs as spring means but in practice it has turned out that in some applications certain difficulties still are encountered. Thus, the spring becomes too long and transversely non-stable, should the same be capable of acting in the range below 2 Hz, i.e. closely adjacent the lower limit of 1 Hz. Extensive calculation work also is required in this case, and furthermore as far as helically coiled pressure springs are concerned, the selection of the spring wire dimensions and coiling parameters becomes extremely critical.

During further development work according to the basic concept of the above-identified patent it has been found that another kind of spring means actually is more suited for application within the very lowest limit of the vibration range, i.e. 1 Hz, namely hydropneumatic springs of the basic type which has been used in some modern passenger cars. An essential draw back of such hydropneumatic springs is, however, their incapability of accommodating higher frequencies without the necessity of increasing the gas pressure in the springs to extremely high values. Therefore, the present invention is based on considerations of how to effectively combine such a hydropneumatic spring with some other kind of spring means which can accommodate the higher frequencies and thus constitute a required complement and allow movements between two bodies while maintaining a plurality or all degrees of freedom of the movements therebetween. It has now turned out that this is possible to achieve in a surprisingly simple and satisfying manner which thus constitutes the very heart of the present invention.

The features essentially distinguishing the present invention are that the spring member is connected with one of said bodies by means of a supplemental elastomeric spring means which is attached to said one body, said supplemental spring means surrounding the cylindrical outer surface of the spring member so as to allow restricted universal movements of said spring member from a center position against a predetermined and not unessential oppositional force, while the spring member is connected with the other of said bodies by a pivot.

The supplemental spring means according to the invention constitutes a very advantageous complement to the spring member which not only provide for movements of all degrees of freedom but also forms a stroke end damper for axial movements of the spring member. In its entirety, the spring suspension system is compact, simple and reliable, which is essential in most applications.

Figure 2:
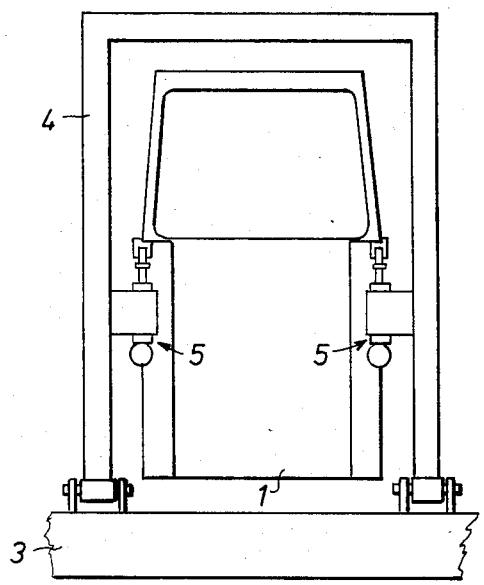
Figure 3:
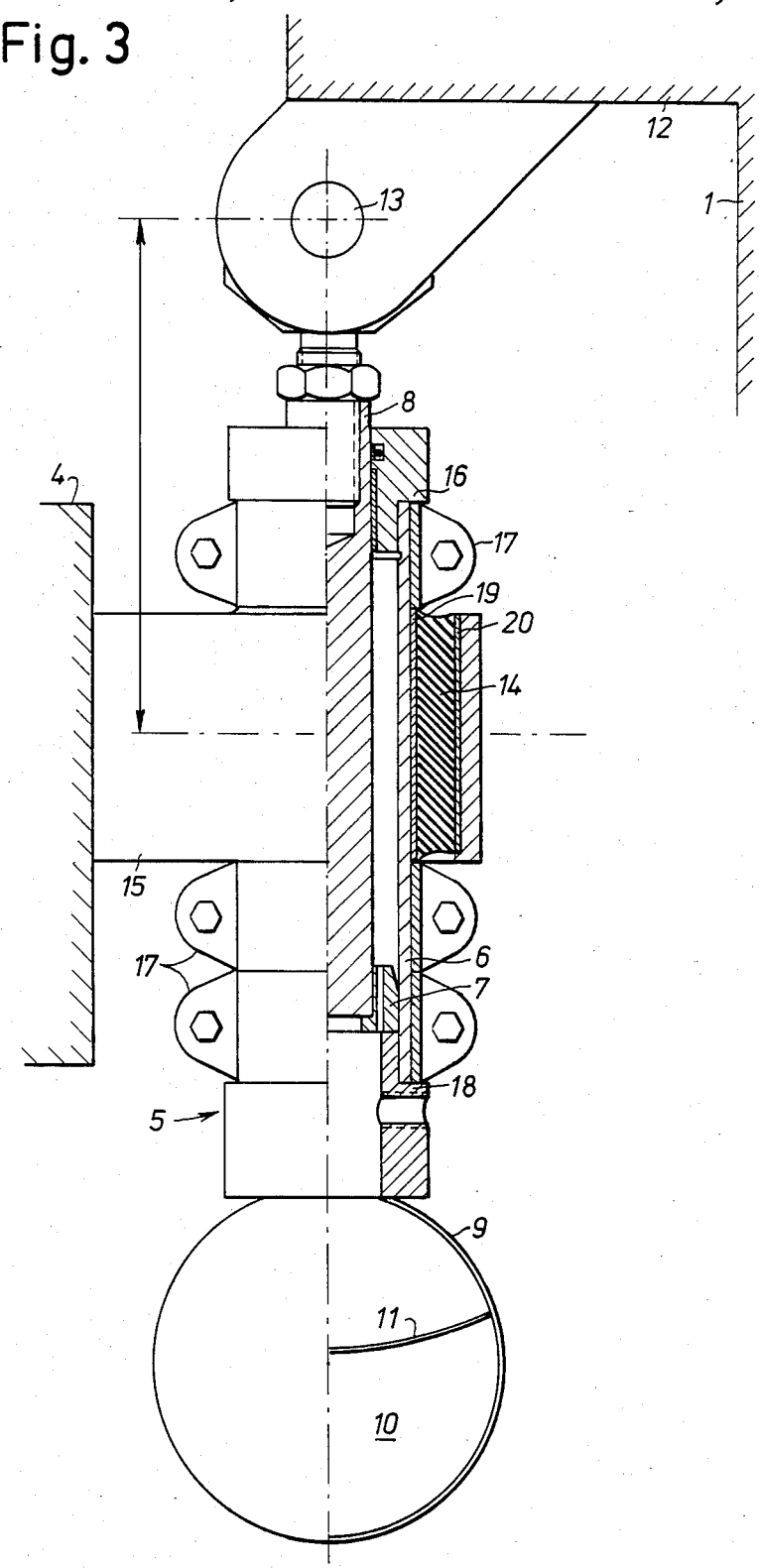
Figure 4:
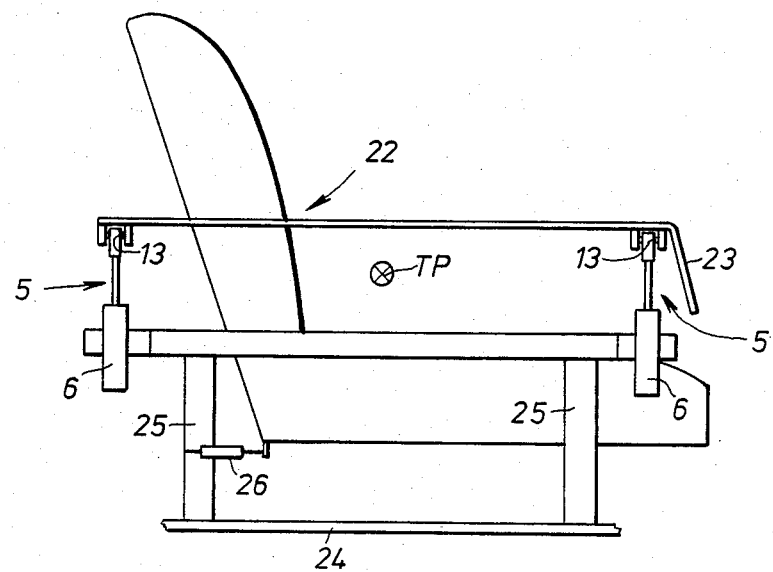
Figure 5:
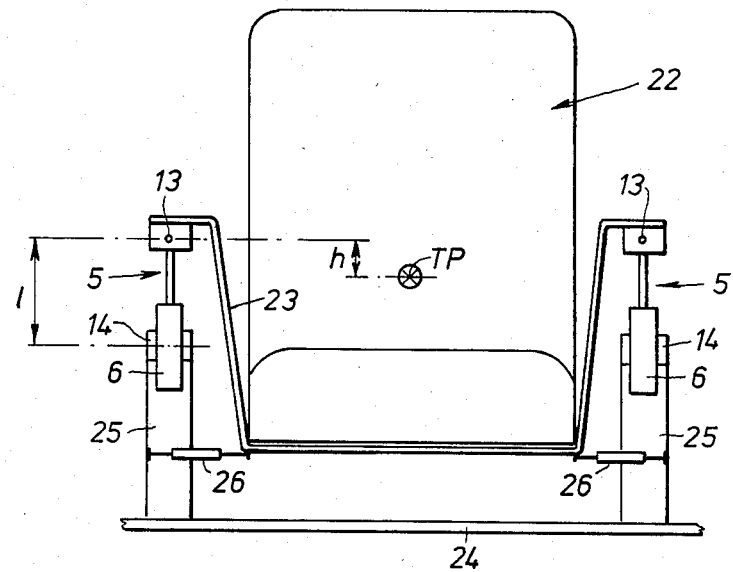

By way of example, the invention will be further disclosed below with reference to the accompanying drawings, in which FIG. 1 is a side elevational view and FIG. 2 an end view of the arrangement according to the invention as applied to a resiliently supported driver's compartment of a contractor vehicle, FIG. 3 is an enlarged partial view, partly sectioned, of one on the spring members of the embodiment according to FIGS. 1 and 2, and FIG. 4 is a side elevational view and FIG. 5 an end view of the arrangement according to the invention as applied to the resilient suspension of a seat.

In FIGS. 1 and 2 of the drawings the arrangement according to the invention is illustrated as applied to a spring system for supension of a driver's compartment 1 at the front end of a heavy-duty transport vehicle having a nonresilient wheel suspension for front wheels 2 and a frame portion 3 protruding forwardly thereof. As illustrated, the driver's compartment 1 is suspended from a surrounding frame-like protecting cage 4 by means of spring members 5 which are spaced around the periphery of the compartment, and within the compartment is a driver's seat 1'.

The shape and arrangement of the spring members 5 is illustrated more closely in the enlarged partial view thereof in FIG. 3. In this case, the spring member consists of a hydropneumatic spring 5 known per se and having a cylindrical body 6 with a piston 7 slidably mounted therein and having a piston rod 8 protruding from one end of the cylinder 6. At the opposite end of said cylinder 6 is a pressure chamber 9 in which is confined a volume of hydraulic liquid put under pressure from a gas cushion 10, separated from the liquid by means of a membrane 11. At its free end, the piston rod 8 is connected to one of the two bodies, between which the spring system is adapted to operate, in the present case namely a bracket 12 on the driver's compartment 1. The connection between the free end of the piston rod 8 and the bracket 12 is formed as an articulation 13 of suitable kind, in the present case a pivot. In many applications, however, the articulation 13 might be made as an universal joint.

The hydropneumatic spring 5 is connected to the other of the two bodies, namely the protecting cage 4, by means of a bushing-like elastomeric means 14 which surrounds the outer surface of the cylinder 6 of the hydropneumatic spring 5 and is supported from a sleeve-like bracket 15, secured to the cage 4. Preferably the elastomeric means 14 is made of rubber of a predetermined hardness and/or spring coefficient selected to the actual application case and constitutes as such a commercially available standardized component. For providing an easy adjustment of the vertical level of the hydropneumatic spring 5 in the elastomeric means 14 and hence the bracket 15 for adjustment of the lever length 1 between the bracket 15 and the articulation 13 and thus the spring characteristic of the whole suspension system it is suitable that the elastomeric means 14 is moveable along the outer surface of the cylinder 6 and in that between a collar 16 at the piston rod end thereof and the elastomer means 14 can be mounted one or more detachable spacing means 17 if desired, said spacing means 17 being made as split clamps. In the drawings it has thus been illustrated one such spacing means 17 mounted above the elastomeric means 14, while two similar spacing means 17 have been used for filling up the rest of the exposed portion of the cylinder 6 between the lower surface of the elastomeric means 14 and a collar 18 at the end of the cylinder 6, where the pressure chamber 9 is located so that the cylinder 6 also is prevented from being slid upwardly in the elastomeric means 14.

The hydropneumatic spring 5 illustrated in the drawings is provided with suitable means for also obtaining a shock-absorbing action which is suitable in the illustrated embodiment. The elastomeric means 14, to the inner and outer peripheral surfaces of which are rigidly secured metal sleeves 19, 20 as known per se by vulcanization, now allows obtaining movements of all degrees of freedom of the resiliently supported body of the system, i.e. the driver's compartment 1. At the same time, it also effectively serves as a stroke end damper downwardly in vertical direction, simultaneously with the elastomeric material also making the total frequency of the spring suspension system being lower than of the hydropneumatic spring solely. Hence it is obtained a very effective and simple solution to the problem of resiliently supporting various parts, particularly in connection with vehicles of various kinds and most particularly driver's compartments of heavy-duty contractor vehicles, forest machines etc. The invention is particularly advantageous as far as the mounting conditions and adaptation abilities to various driving conditions and driver's compartment weights are concerned. A simple adaptation might namely be achieved by changing the gas pressure of the hydropneumatic spring 5 as known perSe. Thus the same components easily can be brought to suit all compartments and the only adjustment necessary to be made thus is the oil pressure of the spring 5 for obtaining a sufficient characteristic of the spring suspension system.

In FIGS. 1 and 2 of the drawing the compartment 1 has been illustrated suspended by four hydropneumatic springs 5 spaced around the periphery of the compartment, namely one at each corner of the compartment 1. Approximately, the springs 5 are arranged at the middle of the height of the compartment 1, namely such that the connection between the spring member 5 and the compartment 1, i.e. the articulation 13, lies at a predetermined height above the center of gravity of the compartment with the driver seated therein. All the connection points or articulations 13 ought to be located in a common plane. Since the hydropneumatic spring as to its operation is a pressure spring, the connection between the spring member 5 and the vehicle frame 3 under the intermediation of the cage 4, i.e. the bracket 15, is located vertically below the articulation 13 such that the compartment 1 by its own weight always biases the spring members 5.

Various detail designs and locations of the spring suspension units are possible, however, within the scope of the invention. When there is lack of space, the spring member 5 can be mounted with its mountings turned upside down, i.e. such that the bracket 15 supporting the elastomeric means 14 which surrounds the cylinder 6 of the hydropneumatic spring 5, is attached to the driver's compartment 1, while the piston rod with its free end is articulated to the cage 4. Furthermore, instead of four spring members 5, one at each corner of the compartment 1, three spring members 5 can be used in a suitable location, i.e. one at the middle of the rear wall of the compartment and one at each side of the compartment, such that the spring means 5, as seen in a horizontal view, form the corner of an isosceles triangle. However, it is also possible to have only two spring members 5, one at each side of the compartment and with an imaginary connection line between the spring means passing through the center of gravity of the compartment, as seen in a plan view. Both the last-mentioned alternative number of spring members might be suitable to utilize in particular cases, preferably if they have asymmetric shape.

Also when a driver's compartment or similar space cannot be mounted resilient as such in its entirety, the same conditions of movement and damping requirements in all essentials still are valid to the driver's seat as such and in such case it is also possible to apply the present invention only to a driver's seat as will be further described below with reference to FIGS. 4 and 5 of the drawings.

In said figures it is illustrated a seat 22 which through a supporting framework 23, which also forms arm rests, is supported from a base 24 under the intermediation of four spring members 5 of the same kind as illustrated in connection with the embodiment of FIGS. 1-3 although at a correspondingly reduced size and arranged one at each corner of the seat. More closely, said spring members are hydropneumatic springs 5 which at the free end of the associated piston rod are hingedly connected at 13 to the framework 23. Through a surrounding elastomeric means or body 14 the cylinder 6 of the spring member 5 in its turn is connected with a supporting frame 25 standing on the base 24. The elastomeric means 14 is of the same bushing-like kind as in the embodiment previously described and in a similar manner it is secured to a bracket or attachment in the supporting frame 25. By means of a suitably selected lever length 1 of the distance between the particulated mounting 13 of the piston rod in the frame work 23 and the attachment of the cylinder 6 in the supporting frame 25 and the height h of the articulation 13 above the center of gravity TP all requirements as to desired spring movements easily can be met. In the normal case the spring members 5 might not need to be made with a damping action. Also as far as this embodiment in connection with a resilient suspension of a chair or seat is concerned the same possibilities as to varying embodiments are applicable as in the embodiment already disclosed above.

Owing to the fact that the center of gravity TP of the seat always is located at a selected predetermined distance h below the articulated joint 13 of the spring member 5, the seat of course will be self-stabilizing but if desired further damping means 26 can be mounted between the supporting frame 25 and the seat framework 23 as illustrated in the drawings.

In the afore-mentioned description it has been stated in connection with both embodiments that the spring member 5 is a hydropneumatic spring of commonly known type and having an essentially cylindrical outer surface. It is, however, also possible to use within the scope of the invention other spring means having essentially the same cylindrical outer surface, such as a helically coiled pressure spring enclosed by a suitable guiding cylindric cover. Also other modifications and adaptations of the parts of the arrangement according to the invention might be obvious to artisans.

I claim:

1. In a device for resiliently supporting a driver's compartment which is subjected to vibrations in a heavy-duty vehicle having a nonresilient wheel suspension, said compartment having at least one seat therein and being connected to a frame portion of said vehicle by means of a spring suspension system comprising a plurality of springs which are disposed in spaced relation to one another and which are located respectively between said compartment and said frame portion, each of said springs being located substantially at the horizontal level of the center of gravity of said compartment, the improvement wherein each of said springs in said spring suspension system comprises a hydropneumatic spring which includes an elongated rigid cylindrical casing having a pressurized chamber connected to one end of said casing, a piston which is slideably movable within said casing along the central axis of said casing, said piston being connected to a piston rod which protrudes outwardly of the other end of said casing and which is connected by means of an articulated joint to one of said compartment and frame portion, said spring being connected to the other of said compartment and frame portion by an elastomeric bushing which surrounds the exterior of said cylindrical casing at an intermediate position on said casing and a bracket which connects said elastomeric bushing to the other of said compartment and frame portion, said piston being located within said casing between said elastomeric bushing and said pressurized chamber whereby said piston and said articulated joint are located respectively on opposite sides of said bushing, and means for adjustably fixing the position of said elastomeric bushing along said casing so as to adjust the distance between said elastomeric bushing and said articulated joint thereby to adjust the spring characteristic of said spring suspension system.

2. The structure of claim 1 wherein said articulated joint connects said piston rod to said compartment, said bracket connecting said elastomeric bushing to said frame portion of said vehicle.

3. The structure of claim 2 wherein said articulated joint is a pivot joint.

4. In a device for resiliently supporting a driver's compartment which is subjected to vibrations in a heavy-duty vehicle having a nonresilient wheel suspension, said compartment having at least one seat therein and being connected to a frame portion of said vehicle by means of a spring suspension system comprising a plurality of springs which are disposed in spaced relation to one another and which are located respectively between said compartment and said frame portion, each of said springs being located substantially at the horizontal level of the center of gravity of said compartment, the improvement wherein each of said springs in said spring suspension system comprises an elongated rigid cylindrical casing having an element therein which is resiliently movable relative to said casing along the central axis of said casing, one end of said resiliently movable element being connected to a rod which protrudes outwardly of the other end of said casing and which is connected by means of an articulated joint to one of said compartment and frame portion, said spring being connected to the other of said compartment and frame portion by an elastomeric bushing which surrounds the exterior of said cylindrical casing at an intermediate position on said casing and a bracket which connects said elastomeric bushing to the other of said compartment and frame portion, and means for adjustably fixing the position of said elastomeric bushing along said casing between the opposing ends of said casing so as to adjust the distance between said elastomeric bushing and said articulated joint thereby to adjust the spring characteristic of said spring suspension system, the opposing end of said casing defining a pair of collars respectively, said means for adjustably fixing the position of said bushing along said casing comprising clamp means disposed on the exterior of said casing between at least one end of said bushing and at least one of said pair of collars.

5. The structure of claim 4 wherein said elastomeric bushing comprises a pair of concentric metallic sleeves disposed in radially spaced relationship to one another, and an elastomeric annulus located between and secured to said pair of sleeves, the inner one of said sleeves being slidable along the exterior of said casing in the absence of said clamp means, said clamp means comprising a plurality of split clamps which are disposed between said pair of collars and the opposing ends of the inner one of said sleeves.

6. In a device for resiliently supporting a driver's compartment which is subjected to vibrations in a heavy-duty vehicle, said compartment having at least one seat therein and being connected to a frame portion of said vehicle by means of a spring suspension system which is located between said compartment and said frame portion, the improvement wherein said spring suspension system comprises a plurality of spaced hydropneumatic springs each of which includes an elongated rigid cylindrical casing having a pressurized chamber connected to one end of said casing, a piston which is slideably movable within said casing along the central axis of said casing, said pison being connected to a piston rod which protrudes outwardly of the other end of said casing and which is connected by means of an articulated joint to one of said compartment and frame portion, an elastomeric bushing which surrounds the exterior of said cylindrical casing at an intermediate position on said casing, a bracket which connects said elastomeric bushing to the other of said compartment and frame portion thereby to connect said hydropneumatic spring laterally thereof between its ends to said other of said compartment and frame portion, and means for varying the distance between said elastomeric bushing and said articulated joint thereby to adjust the spring characteristic of said spring suspension system.

* * * * *